United States Patent

Yada et al.

[11] Patent Number: 5,986,448
[45] Date of Patent: Nov. 16, 1999

[54] REVOLVING SPEED DETECTING DEVICE WITH REDUCED EDDY CURRENT LOSS

[75] Inventors: Yuji Yada; Tsugito Nakazeki, both of Iwata; Tetsuo Hiura, deceased, late of Hiroshima, all of Japan, by Minoru Hiura, Emiko Hiura, heirs

[73] Assignee: NTN Corporation, Osaka, Japan

[21] Appl. No.: 07/993,768

[22] Filed: Dec. 22, 1992

[30] Foreign Application Priority Data

Dec. 27, 1991 [JP] Japan .................................... 3-346557
Dec. 27, 1991 [JP] Japan .................................... 3-346575

[51] Int. Cl.$^6$ ................................. G01P 3/44; G01P 3/46
[52] U.S. Cl. .......................... 324/173; 324/163; 384/448
[58] Field of Search .................................... 324/160, 163, 324/166, 173, 174, 207.16, 207.25; 310/168, 68 B; 384/448

[56] References Cited

U.S. PATENT DOCUMENTS

| 3,716,787 | 2/1973 | Hammond | 324/173 |
| 3,939,416 | 2/1976 | Maskery | 324/174 |
| 4,001,687 | 1/1977 | Sorkin et al. | 324/173 |
| 4,025,934 | 5/1977 | Hartmann et al. | 324/163 |
| 4,121,112 | 10/1978 | Hartig | 324/173 X |
| 4,259,637 | 3/1981 | Bloomfield et al. | 324/207.16 X |
| 4,461,994 | 7/1984 | MacDonald | 324/174 |
| 4,574,237 | 3/1986 | Hachtel et al. | 324/173 |
| 4,652,820 | 3/1987 | Maresca | 324/207.16 |
| 4,914,387 | 4/1990 | Santos | 324/166 |
| 5,070,264 | 12/1991 | Conrad | 324/173 X |
| 5,107,210 | 4/1992 | Shirao et al. | 324/207.12 |

FOREIGN PATENT DOCUMENTS 16037 4/1971 Japan ..................................... 324/173

*Primary Examiner*—Gerard Strecker
*Attorney, Agent, or Firm*—Nikaido Marmelstein Murray & Oram LLP

[57] ABSTRACT

A revolving speed detecting device for use with a rolling contact bearing having a rotary ring and a fixed ring. It has a magnetic ring provided on the peripheral surface thereof with a plurality of teeth at equal pitches and mounted on the rotary bearing ring. A sensor made of soft ferrite or by laminating a plurality of silicon steel plates is mounted on the fixed bearing ring opposite to the teeth of the magnetic ring. A coil is wound around the sensor. A high-frequency voltage generator is connected to the coil. A detecting device for detecting the output voltage of the coil is also connected to the coil.

1 Claim, 4 Drawing Sheets

US 5,986,448

REVOLVING SPEED DETECTING DEVICE WITH REDUCED EDDY CURRENT LOSS

FIELD OF THE INVENTION

This invention relates to a revolving speed detecting device for use with a bearing supporting a wheel or a steering shaft of an automobile.

BACKGROUND OF THE INVENTION

An automobile equipped with an anti-skid brake system is provided with means for detecting the wheel speed through the rotation of a bearing supporting each vehicle wheel.

One of such revolving speed detecting devices is disclosed in Japanese Patent Application 3-247766 filed by the present applicant.

This device comprises, as shown in FIGS. 5A and FIG. 5B, a pulser ring 33 and a detector ring 34 having, respectively, a plurality of teeth 35 and 36 and mounted on the respective peripheral surfaces of a rotatable bearing ring 31 and a fixed bearing ring 32. Around the detector ring 34 is wound a coil L connected to a high-frequency voltage application means 37. In this arrangement, by exciting the coil L with a high-frequency voltage having a frequency fo, a magnetic circuit is formed between the pulser ring 33 and the detector ring 34. When the pulser ring 33 begins to rotate in this state, the magnetic reluctance will vary, which will in turn vary the inductance of the coil. The output voltage of the coil is applied to a rectifying/smoothing circuit 38 to remove carrier components of fo. The signal thus obtained is compared with a set value m in a comparison circuit 39 to obtain a pulse signal corresponding to the revolving speed of the bearing.

Because of its complicated structure, the detector ring 34 has to be made by forming soft iron. But, since such a metal has a high conductivity, an eddy current will be produced if such a ring is placed in an alternating magnetic field. If an eddy current is produced in the detector ring 34, its sensitivity to the inductance of the coil will drop, thus making it difficult to detect the rotation with a high degree of accuracy.

Further, the above device uses a fixed value m as the set value to be compared with the smoothed signal in the comparison circuit 39. Actually, however, the output voltage of the coil L may change due to dimensional variations when assembling the circuits or fluctuations in temperature while in use and as a result, the amplitude or the average of the smoothened voltage signal may fluctuate markedly.

In such a case, no pulse signal indicative of the revolving speed is obtainable unless the fixed set value m is within the range of fluctuation of the smoothed signal.

SUMMARY OF THE INVENTION

It is therefore a first object of this invention to provide a revolving speed detecting device which can reduce the eddy current loss of the sensor and which can detect the revolving speed with a high degree of accuracy.

A second object of this invention is to provide a revolving speed detecting device which can detect the revolving speed stably and reliably irrespective of the fluctuation of the output voltage of the coil.

In order to attain the first object, there is provided a revolving speed detecting device for use with a rolling contact bearing having a rotatable ring and a fixed ring, the device comprising a pulser ring provided on the peripheral surface thereof with a plurality of teeth at equal pitches and fixedly mounted on the rotatable ring, a sensor made of soft ferrite or by laminating a plurality of silicon steel plates and mounted on the fixed ring opposite to the teeth of the pulser ring, a coil wound around the sensor, a high-frequency voltage application device connected to the coil, and a detecting device connected to the coil for detecting variations in the voltage of the coil, This revolving speed detecting device may further comprise an annular retaining frame press-fitted on the fixed ring and a resin layer provided in the retaining frame, with the sensor embedded in the resin layer.

On the other hand, in order to attain the second object, there is provided a revolving speed detecting device for use with a rolling contact bearing having a rotatable ring and a fixed ring, the device comprising a pulser ring provided on the peripheral surface thereof with a plurality of teeth at equal pitches and fixedly mounted on the rotatable ring, a magnetic member mounted on the fixed ring opposite to the teeth of the pulser ring, a coil wound around the magnetic member, a high-frequency voltage application device connected to the coil, a rectifying/smoothing circuit connected to the coil for removing carrier components from an output voltage of the coil, a comparison circuit connected to the rectifying/smoothing circuit for comparing a signal smoothed in the rectifying/smoothing circuit with a set value, the comparison circuit having an input terminal for inputting the set value, and a lowpass filter having a break frequency of several hertz or less, the rectifying/smoothing circuit having an output terminal connected to the input terminal of the comparison circuit through the lowpass filter.

In the first embodiment, by applying a high-frequency voltage to the coil, the sensor made of soft ferrite is magnetized and a magnetic circuit is formed between the sensor and the pulser ring of a ferromagnetic material. As the pulser ring begins to rotate in this state, the magnetic reluctance of the magnetic circuit varies and so does the inductance of the coil, The variation in inductance is taken out in the form of variations in voltage to detect the revolving speed of the rotatable ring.

Since soft ferrite shows low coercive force and hysteresis loss and has a large electrical resistance comparable to an electrical insulating material, no eddy current will be produced inside. This improves the detecting sensitivity to variations in inductance in the coil. The same effect will be obtainable with a sensor, made by laminating a plurality of silicon steel plates though its structure is more complicated, The sensor of soft ferrite is formed by extruding a mixture of ferrite powder and an insulating material such as rubber or plastic.

In the second embodiment, the signal smoothened in the rectifying/smoothing circuit and the low-frequency signal obtained by filtering the smoothened signal by use of a lowpass filter are input in the comparison circuit. By comparing these two signals, a pulse signal is produced.

Since the low-frequency signal filtered in the lowpass filter fluctuates with the fluctuation in the output voltage of the coil, it always represents the mean value of the smoothened signal. Thus, a pulse signal can be produced stably.

DESCRIPTION OF THE DRAWINGS

Other features and objects of the present invention will become apparent from the following description taken with reference to the accompanying drawings, in which.

DESCRIPTION OF THE PREFERRED EMBODIMENTS

Figure 1A:
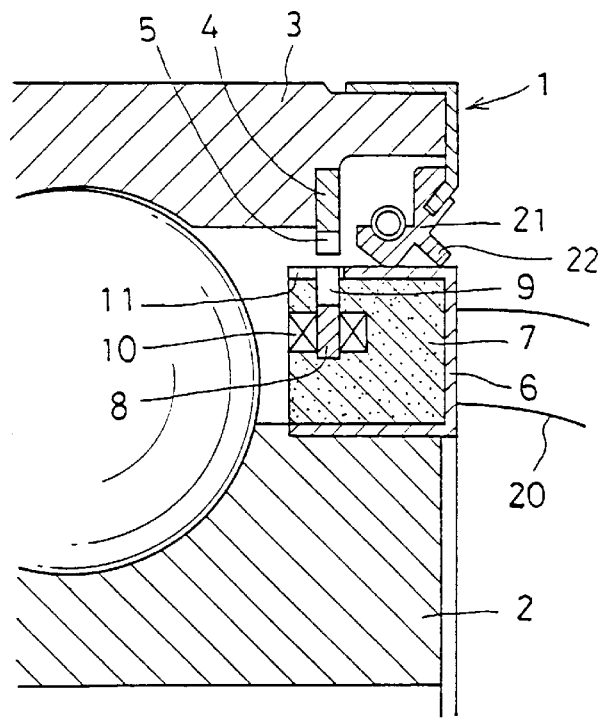
FIGS. 1A is a sectional view of one embodiment.
Figure 1B:
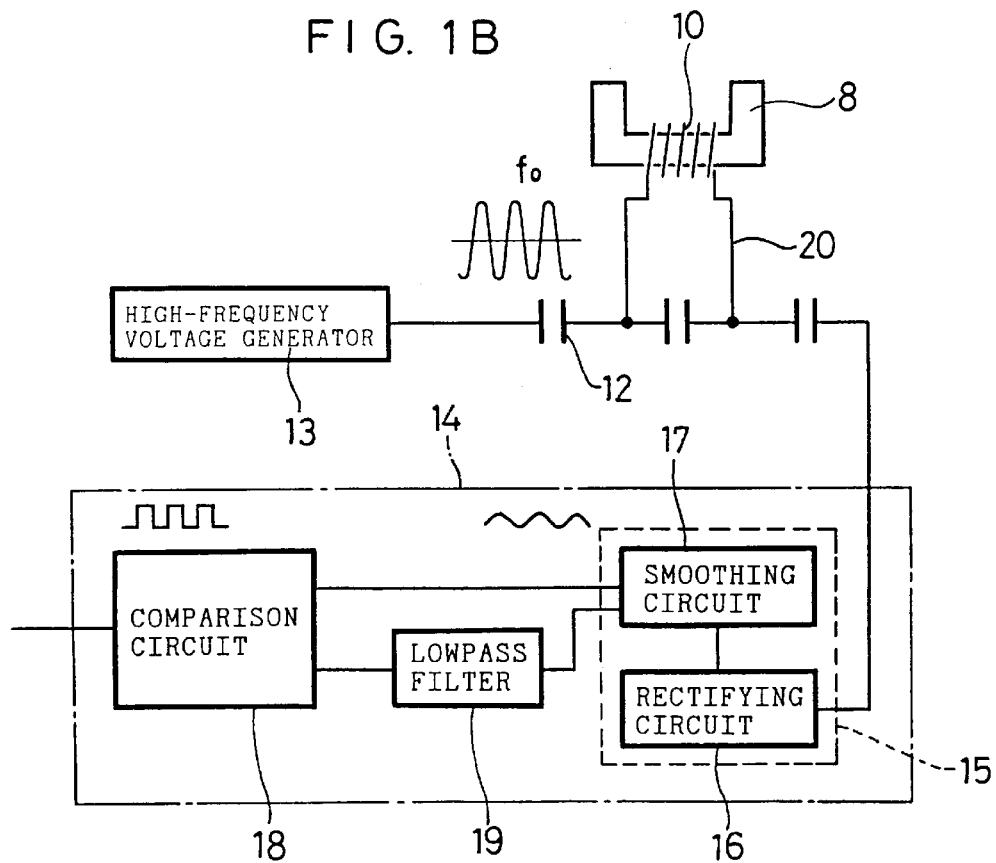
FIGS. 1B is a block diagram showing the voltage detecting structure of the same.
Figure 2:
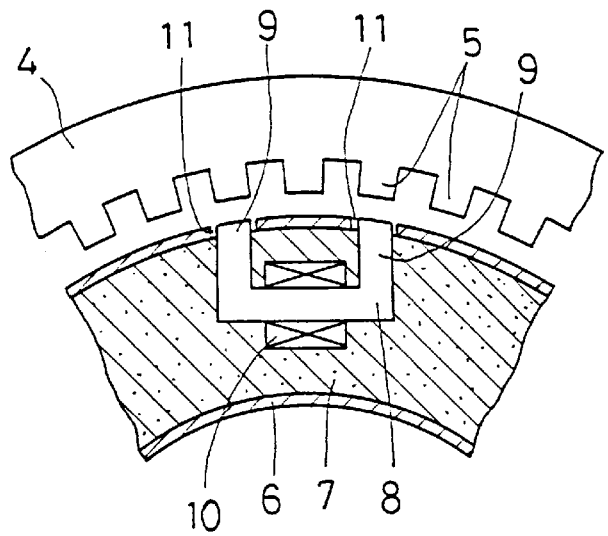
FIG. 2 is a sectional view showing how the pulser ring and the sensor are mounted.

FIGS. 1A, 1B and 2 show the revolving speed detecting device of the first embodiment, A rolling contact bearing 1 shown in FIG. 1A is used with a fixed inner ring 2 and a rotatable outer ring 3 rotatably mounted. A pulser ring 4 is mounted on the inner peripheral surface of the rotatable outer ring 3. The pulser ring 4 is formed by laminating a plurality of silicon steel plates and is provided on the inner peripheral surface thereof with a plurality of teeth 5 disposed over the entire circumference at equal pitches.

An annular retaining frame 6 made of a metal and having a ⊐-shaped section is press-fitted on the outer periphery of the fixed inner ring 2. A sensor 8 made of soft ferrite is embedded in a resin layer 7 provided by molding in the retaining frame 6.

The sensor 8 has at both ends thereof at least a pair of protrusions 9 opposed to the teeth 5 of the pulser ring 4. A coil 10 is wound between the protrusions 9. The protrusions 9 are engaged in recesses 11 formed in the retaining frame 6 so as to oppose the teeth 5 of the pulser ring 4 with a gap defined therebetween.

As shown in FIGS. 1A, 1B, 2 and 4, the coil 10 wound around the sensor 8 forms an LC resonance circuit in cooperation with capacitors 12 connected in series relative to each other with a pair of capacitors being connected in parallel relative to each end of the coil. A high-frequency voltage generator 13 and a voltage detecting means 14 are connected to the resonance circuit.

The high-frequency voltage generator 13 generates a high-frequency voltage in the form of a sine curve having a frequency of 10 KHz. The coil 10 is excited by applying the high-frequency voltage to the coil.

The voltage detecting means 14 comprises a rectifying/smoothing circuit 15 made up of a rectifying circuit 16 and a smoothing circuit 17 for removing carrier components, and a comparison circuit 18. The smoothing circuit 17 is directly connected to one of two input terminals of the comparision circuit. To the other input terminal is connected a lowpass filter 19 connected to the smoothing circuit 17. The lowpass filter 19 has a break point frequency of several hertz or less. Thus, only the low-frequency component of the signal smoothed in the smoothing circuit 17 is sent to the comparison circuit 18 through the filter 19.

With this arrangement, the output voltage from the resonance circuit comprising the coil 10 and the capacitors 12 is rectified and smoothed in the rectifying/smoothing circuit 15 in the voltage detecting means 14. The thus smoothed signal is input in the comparison circuit 18 through one of its two input terminals, whereas the low-frequency signal that has passed through the lowpass filter 19 is input in the comparison circuit 18 through the other input terminal. In the comparison circuit 18, the smoothed signal is compared with the low-frequency signal and a pulse signal corresponding to the frequency of the smoothed signal is produced.

The voltage detecting means 14 and the high-frequency voltage generator 13 can be built into a power source structure with the high-frequency voltage generator being provided through an output connector. Both the voltage detecting means 14 and the high-frequency voltage generator 13 are connected to the coil 10 through cables 20.

A shown in FIG. 1A, seal member 21 is secured to the end of the outer ring 3 of the rolling contact bearing 1. It has a resilient seal 22 kept in sliding contact with the end face of the retaining frame 6 to prevent muddy water and debris from entering into the bearing.

Now we shall describe the operation of the embodiment.

A high-frequency voltage generated in the high-frequency voltage generator 13 is applied to the coil 10 to excite it and thus to magnetize the sensor 8 made of soft ferrite. As a result, a magnetic circuit is formed between the sensor 8 and the pulser ring 4.

When the rolling contact bearing 1 begins to rotate in this state and the pulser ring 4 and the sensor 8 rotate relative to each other, the magnetic reluctance in the magnetic circuit and thus the inductance of the coil 10 vary periodically.

Figure 5A:
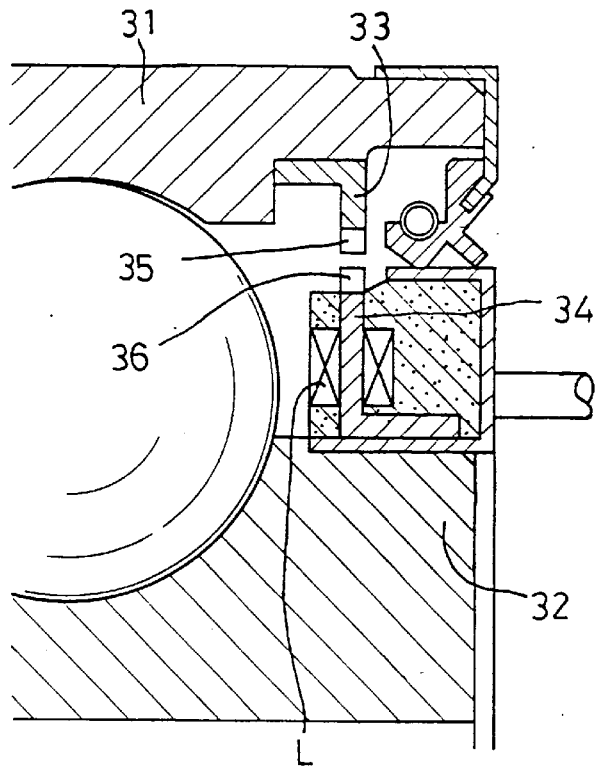
FIG. 5A is a sectional view of a prior art device.

In this case, since the LC resonance circuit is made up of the coil 10 and the capacitors 12 connected in to the coil 10, when the coil 10 is excited with a predetermined frequency fo, the inductance of the coil 10 and thus the amplitude of the resonance circuit will vary. By rectifying and smoothing the output voltage thus obtained in the voltage detecting means 14, carrier components fo are removed. Thus, a smoothed signal E as shown in FIG. 5A is obtained.

Figure 3A:
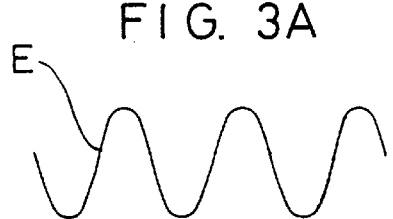
FIG. 3A is a view showing the waveform of the smoothed signal.
Figure 3B:
FIG. 3B is a view showing the waveform of the low-frequency signal.
Figure 3C:
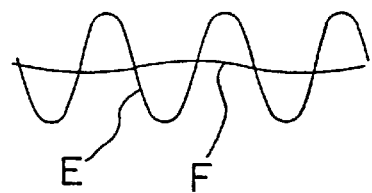
FIG. 3C is a view showing the relation of these waveforms.

The smoothed signal E is input in the comparison circuit 18 through one of its two input terminals, whereas a low-frequency signal (F) shown in FIG. 3B, obtained by filtering out the high-frequency components of the signal E in the lowpass filter 19, is applied to the other input terminal. As the output voltage of the resonance circuit fluctuates, the low-frequency signal F varies with the smoothed signal. In other words, it always represents approximately a mean value of the smoothed signal. Thus, when comparing the smoothed signal E and the low-frequency signal F in the comparison circuit 18, they always extend crossing each other as shown in FIG. 3C. Since they cross each other at a plurality of points, a pulse signal is obtainable which represents the revolving speed of the pulser ring 4.

With this arrangement, since soft ferrite has a large electrical resistance, no eddy current will be produced inside. This improves the detecting sensitivity to the variations in inductance.

Figure 5B:
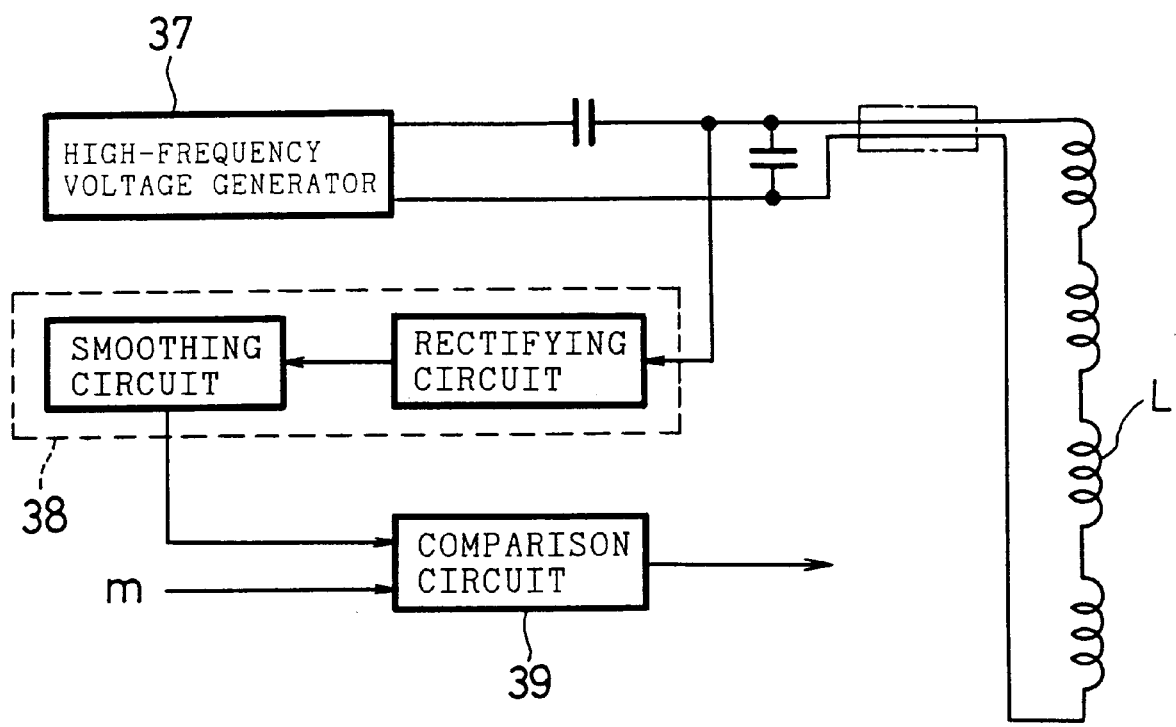
FIG. 5B is a block diagram showing the voltage detecting structure of the same.

In the above embodiment, the pulser ring 4 is provided opposite to the sensor 8. But, it is possible to attain the same function by providing the detecting device shown in FIGS. 5A and 5B with the lowpass filter 19 shown in FIG. 1B in the line between the rectifying/smoothing circuit 38 and the comparison circuit 39.

Figure 4:
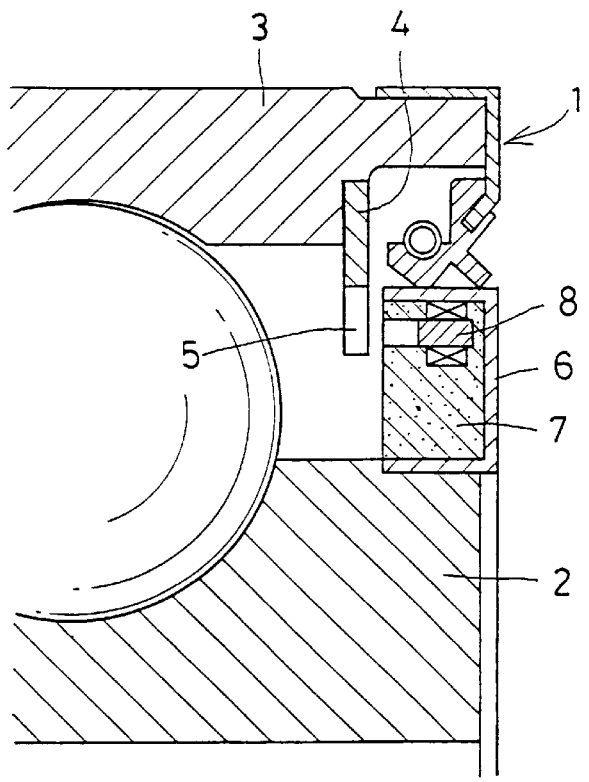
FIG. 4 is a sectional view of another embodiment.

FIG. 4 shows another embodiment, in which the sensor 8 is provided at a position not radially but axially opposite to the teeth 5 of the pulser ring 4. Otherwise, this embodiment is the same in structure and function as the first embodiment.

In the above embodiments, a single sensor 8 is mounted inside the retaining frame 6. But a plurality of sensors may be mounted opposite to the pulser ring 4.

Such a plurality of sensors may be formed of a plurality of silicon steel plates laminated one on another so that they show substantially the same characteristics.

The present invention is equally applicable to a rolling contact bearing of the type in which the inner ring is rotatable,

What is claimed is:

1. A revolving speed detecting device for use with a rolling contact bearing having a rotatable ring and a fixed ring, said device comprising:

a pulser ring provided on a peripheral surface thereof with a plurality of teeth at equal pitches and said pulser ring fixedly mounted on said rotatable ring;

a sensor made of soft ferrite and said sensor mounted on said fixed ring opposite to said teeth of said pulser ring, said sensor including a sensor body and a pair of protrusions extending from both ends of said sensor body toward said pulser ring to oppose two of the teeth of said pulser ring;

a coil wound around said sensor body of said sensor;

an annular retaining frame press-fitted on said fixed ring and a resin layer provided in said retaining frame, said sensor being embedded in said resin layer;

a high-frequency voltage application means connected to said coil; and a detecting means connected to said coil for detecting variations in voltage of said coil.

* * * * *